United States Patent [19]

Geshwind

[11] Patent Number: 4,606,625
[45] Date of Patent: Aug. 19, 1986

[54] METHOD FOR COLORIZING BLACK AND WHITE FOOTAGE

[76] Inventor: David M. Geshwind, 184-14 Midland Parkway, Jamaica, N.Y. 11432

[21] Appl. No.: 492,816

[22] Filed: May 9, 1983

[51] Int. Cl.⁴ .................. G03B 19/18; G03B 21/32; H04N 1/46
[52] U.S. Cl. ........................ 352/38; 358/81; 352/42; 352/85
[58] Field of Search ............ 352/38, 42, 66, 85; 355/40; 358/81, 82

[56] References Cited

U.S. PATENT DOCUMENTS

| | | | |
|---|---|---|---|
| 3,772,465 | 11/1973 | Vlahos | 355/40 |
| 3,784,736 | 1/1974 | Novak | 358/81 |
| 4,149,185 | 4/1979 | Weinger | 358/81 |
| 4,334,240 | 6/1982 | Franklin | 358/81 |

Primary Examiner—Monroe H. Hayes
Attorney, Agent, or Firm—Handal & Morofsky

[57] ABSTRACT

A system is disclosed in which individual frames are colorized by the addition of manually generated color. Color information is blurred, for example, by passing through a low resolution digital encoder for use in frames adjacent to the one being individually colorized. Interpolative techniques are used to reduce the number of frames which have to be individually colorized.

14 Claims, 4 Drawing Figures

METHOD FOR COLORIZING BLACK AND WHITE FOOTAGE

TECHNICAL FIELD

The invention relates to a method for adding color to existing black and white motion picture footage through a combination of human determinations, computer assisted generation, interpolative processes and time domain processing.

BACKGROUND ART

Presently a great deal of footage from old black and white movies is available. However, much of this footage is relatively unmarkable because of the starkness and plainess of black and white images as compared to color images. This is particularly true in view of the fact that color has permeated not only the motion picture field but also the secondary market of television where old black and white film simply does not have the appeal of a competing color telecast.

In an attempt to solve some of these problems, numerous techniques have evolved. For example, the movie may be reprinted on color film with a sepia color, or other attractive color. The color for various scenes may even be varied depending upon the contents of scenes, the lighting level and the like. Thus blue might be used for a night scene, sepia for an indoor scene and green in a park like setting.

In an attempt to get a mixture of coloration on black and white television shows, products have even been marketed which comprise a thin transparent plastic film which is adhered to a television screen and which contain several stripes of color, for example, a blue region at the top presumably coloring the sky, a green region on the bottom, corresponding to foliage, and a brown region in the center corrsponding to the various characters in the scene. However none of the above systems are capable of individually providing the various elements in the picture with realistic colors.

The alternative to this type of colorization is individual coloring of each frame of the movie. Naturally, this is a manual operation and, involves the colorization of a great number of frames and accordingly a relatively great expense.

DISCLOSURE OF INVENTION

In accordance with the present invention the colorization of existing black and white footage is achieved by individually, for a first frame, outlining the regions to be colorized in various colors, storing this information in a random access memory and using a computer to "fill in" the various colors inside the various regions in the scene in accordance with the stored information. The color information contained in the first colored frame is then used on all successive frames until half way to the next frame to be individually colored is reached after which the color information from that second colored frame is used. Alternatively, a mixture of information may be used. Because the color information for each Nth frame is inaccurate for the frames which lie between every Nth frame, the reduction of physiologically perceptible inaccuracies in colorization is achieved by decreasing the resolution of the color information (i.e., the number of color information pixels), effectively blurring its outlines. Likewise, only color information is stored during this process, thus having the advantage of decreasing the number of bits per second processed by the computer.

Because of the response of the eye, the combination of low resolution color plus high resolution black and white images gives the impression of a high resolution black and white images gives the impression of a high resolution color image. Moreover, not only is the eye insensitive to the fact that the color information used is not strictly accurate, but the resulting color picture looks more realistic than individually colored frames which tend to get a "cartoon-like" appearance. In accordance with a further embodiment of the inventive method, the value of N may be increased greatly by interpolating the outlines for color information to obtain color information for a number of individual frames which lie between the first and the Nth frame and define equal time periods between the first and the Nth frame.

BRIEF DESCRIPTION OF DRAWINGS

One way of carrying out the invention is described below with reference to the drawings which illustrate only several embodiments in which.

BEST MODE FOR CARRYING OUT THE INVENTION

Figure 1:
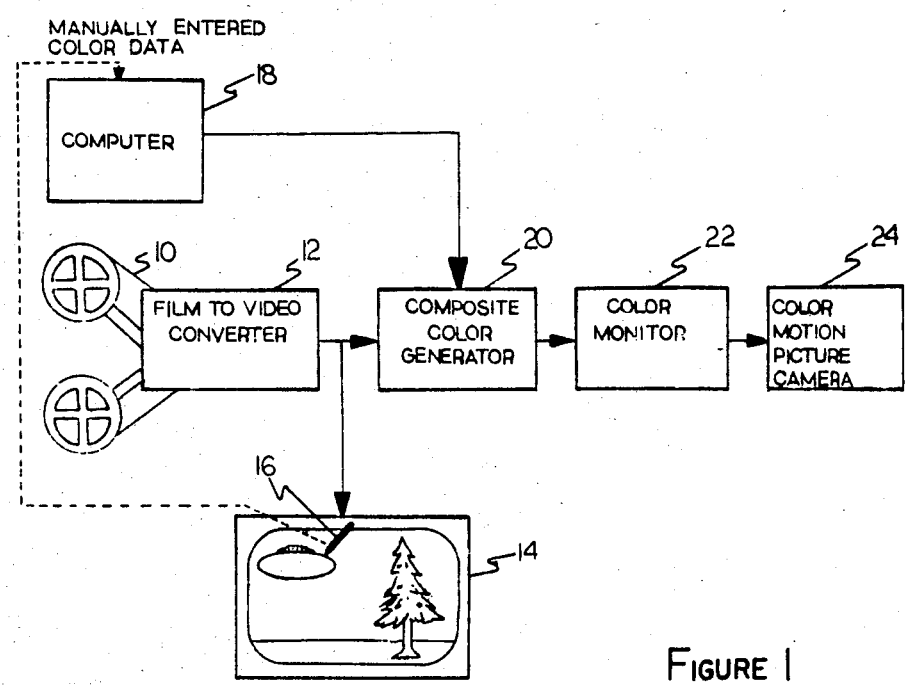
FIG. 1 is a schematic diagram of a system for carrying out the method of the present invention.

An apparatus for practising the inventive method is illustrated in FIG. 1. In accordance with the invention, a frame of a conventional black and white film strip (or black and white video) is processed by a film to video converter 12 into a standard video image which may be displayed on a frame by frame basis on black and white monitor 14. Monitor 14 is equipped with an X-Y position transducer 16 whose output is coupled to a computer 18. The outline of an object of given color, together with an operator instruction regarding the color desired allows computer 18 to generate a color signal timed in synchronism with the video frame. Computer 18, in turn, outputs the color information which is mixed with the black and white video output of film to video converter 12 by a composite color generator 20. The output of color generator 20 is then passed to a color monitor 22. The output of color monitor 22 may be photographed by color motion picture camera 24 to produce a hard copy on photographic film in color of the original frame of black and white film 10.

During practice of the inventive process, the black and white film strip 10 is converted on a frame by frame basis by converter 12 to a video image. The first image of the film strip would be displayed in black and white on monitor 14, as described above, prior to conversion of subsequent images to video signals. The image on the first frame would be held in conventional fashion for continuous display on monitor 14. During the period of continuous display, X-Y position transducer 16 is used to translate the outlines of objects of various colors to generate color control information. For example, position transducer 16 could be made by a manual operator to follow the outside line 26 defining flying saucer 28 in frame 30. At the same time, computer 18 is then instructed that the area within this figure is to be colored red. Outside line 32 defining tree foliage 34 is then followed by the transducer and the computer instructed to generate the color green. In similar fashion trunk 36 may be colored dark brown. The computer is then instructed after the tracing of horizon line 38 to color all remaining material above line 38 blue and all material below line 38 tan. This would result in colorization of the entire picture. The computer could also be instructed respecting which objects are moving, (e.g., flying saucer 28) and which objects are stationary, (e.g., horizon 38). With respect to moving objects, these objects could be surrounded with an aura 40 of their own color which extends beyond their borders in an indistinct and fuzzy fashion. Such extention may also be greater in the direction of movement. In the drawing the bottom of the flying saucer would have such a greater aura. On the other hand, where both objects are stationary the aura of color may be replaced with a mixing zone 42, such as that existing around horizon 38 during which one color would gradually shift to another, thus avoiding a comic book like appearance. As an alternative to a blurry aura or mixing zone, the color information may simply be blurred by using a low resolution digital or analog encoder for the color information.

Once the color information has been added to the first frame computer 18 can add this information via composite color generator 20 to successive and preceeding black and white frames to generate composite color frames in the same sequence for display on color monitor 22 for photographing by color motion picture camera 24. As an alternative to the monitor 22 and camera 24, a conventional digital film print may be used.

If we consider the case where flying saucer 28 is moving in the direction indicated by arrow 44, the color information defined by aura 40 and the surface area within aura 40 may be used in successive and preceeding frames.

In particular, for example, if every Nth frame is colored, the information contained within the Nth individual color frame is then used for frame N/2 through frame N+(N/2)−1, without change. Likewise the color information for the first frame would be used in frames 1 through frame (N/2)−1. This is done by having computer 18 repeating the color information defined by aura 40 (for the nearest individually colored frame) each time on a frame by frame basis, adding it to the particular frame recieved by generator 20, thus passing a series of full color frames to color monitor 22 for photographing by camera 24. Alternatively, on a frame-by-frame basis computer generated color information could be superimposed over each black and white frame on a color monitor with any necessary touch-up done by manually operating an XY position transducer associated with the monitor's screen.

Figure 2:
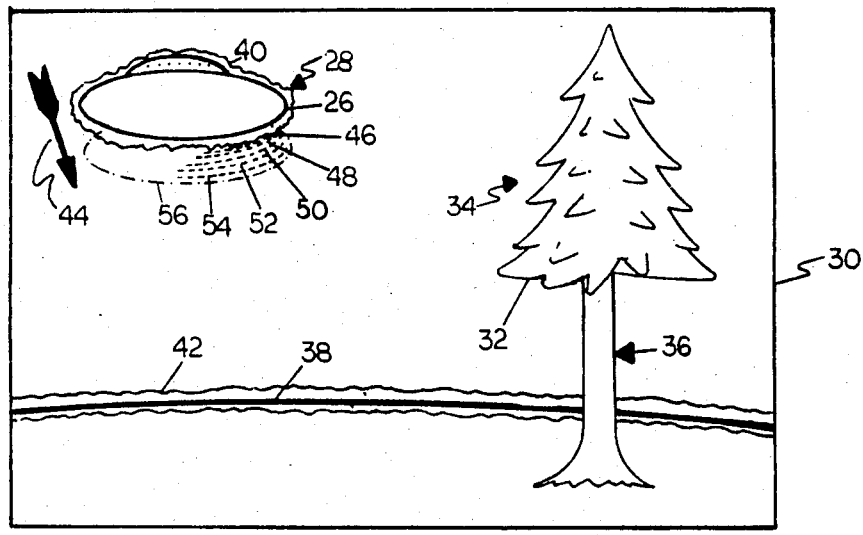
FIG. 2 is a diagram illustrating the method of the invention.

The above is illustrated more clearly with reference to FIG. 2. Halfway to the Nth frame, corresponding to an image of the flying saucer positioned as designated by the numeral 46 in FIG. 2, the color begins to loose its accuracy, due to the displacement between an image positioned between image 26 and image 46. It then becomes necessary to repeat the manual coloring operation on the Nth frame (image 46) that was performed earlier on the first frame 26. The coloring would then be completed for the 2Nth frame 48 through the 6Nth frame 56 resulting in the generation of color information approximations for the flying saucer moving from the position shown in solid lines (image 26), to the position shown in the dot-dashed lines (image 56) in FIG. 2. Intermediate frames 26 and 46 through 56 would use the color information of their closest manually colored frame, as described above. Naturally, to the extent that other objects remain stationary, color information for frame 26 may be reused by the computer 18 for frames 46 through 56.

In the event that it is desired to further reduce the amount of work involved in manually entering color information, after entering color information for the frame shown in solid lines in FIG. 2 (frame 26), one can immediately go to a much later frame, such as the frame containing image 56 and enter the color information associated with image 56 passing over the operations of adding color individually to images 46 through 54. Using standard interpolation software the computer then interpolates between the color information associated with the solid lines in FIG. 2 (image 26) and the color information associated with image 56 to generate the color information associated with intermediate images 46 through 54. Thus, by generating color information for a limited number of boundary points (i.e., images 26 and 56), the computer generates intermediate information for a number of what might be called sub-boundary points or frames (corresponding to images 46–54). By blurring the color information to extend an aura around the actual color information, we can generate a plurality of color information images which would roughly coincide with all frames between individual subpart boundaries defined by images 46–54. If we consider the case where N=10, we could color the first frame individually, go to the 60th frame and color those objects which have moved, allow the computer to generate auras around the colored images associated with the 10th, 20th, 30th, 40th and 50th frames. These interpolated colorized frames may then be individually corrected by an operator. One then plays back the entire sequence adding the operator furnished color information of the first frame, to frames 1 through 4, the interpolated color information of the 10th frame to frames 5 through 14, the interpolated coloration information of the 20th frame to the frames 15 to 24, the interpolated colorization of the 30th frame to frames 25 through 34, and so forth. Alternatively, cross-dissolving may be employed as is discussed below. Thus, if one wished to color 6000 frames in a given motion sequence, it would merely be necessary to enter manually color information completely for one frame and up-date information for 100 additional frames. Such up-date information would be processed in such a manner as to overide non-varying color information, such as the coloring of the sky and the ground above and below horizon 42 in FIG. 2.

As the value for N in the above example increases, jumping of a blurred color image will occur in a physiologically perceptable fashion. This movement in color information can be smoothened by cross-dissolving intermediate blurring color frames by colorizing them with different percentages of adjacent individually colorized frames. The chart below illustrates such a use of mixed color information. In it, each of the frames (frame number) is colorized with a percentage of the color information from its respective earlier (E. Adj. Frame) individually colorized and later adjacent (L. Adj. Frame) frame.

| Frame Number | E. Adj. Frame | % | L. Adj. Frame | % |
| --- | --- | --- | --- | --- |
| 1 | 1 | 100 | 10 | 0 |

-continued

| Frame Number | E. Adj. Frame | % | L. Adj. Frame | % |
|---|---|---|---|---|
| 2 | 1 | 89 | 10 | 11 |
| 3 | 1 | 78 | 10 | 22 |
| 4 | 1 | 67 | 10 | 33 |
| 5 | 1 | 56 | 10 | 44 |
| 6 | 1 | 45 | 10 | 55 |
| 7 | 1 | 34 | 10 | 66 |
| 8 | 1 | 23 | 10 | 77 |
| 9 | 1 | 12 | 10 | 88 |
| 10 | 10 | 100 | 20 | 0 |
| 11 | 10 | 90 | 20 | 10 |
| 12 | 10 | 80 | 20 | 20 |
| 13 | 10 | 70 | 20 | 30 |
| 14 | 10 | 60 | 20 | 40 |
| 15 | 10 | 50 | 20 | 50 |
| 16 | 10 | 40 | 20 | 60 |
| 17 | 10 | 30 | 20 | 70 |
| 18 | 10 | 20 | 20 | 80 |
| 19 | 10 | 10 | 20 | 90 |
| 20 | 20 | 100 | 30 | 0 |

By cross-dissolving between the color portion of frames colored by either the computer or by hand, not every frame need have a unique color component; although for each frame the unique black and white information will be used.

Figure 3:
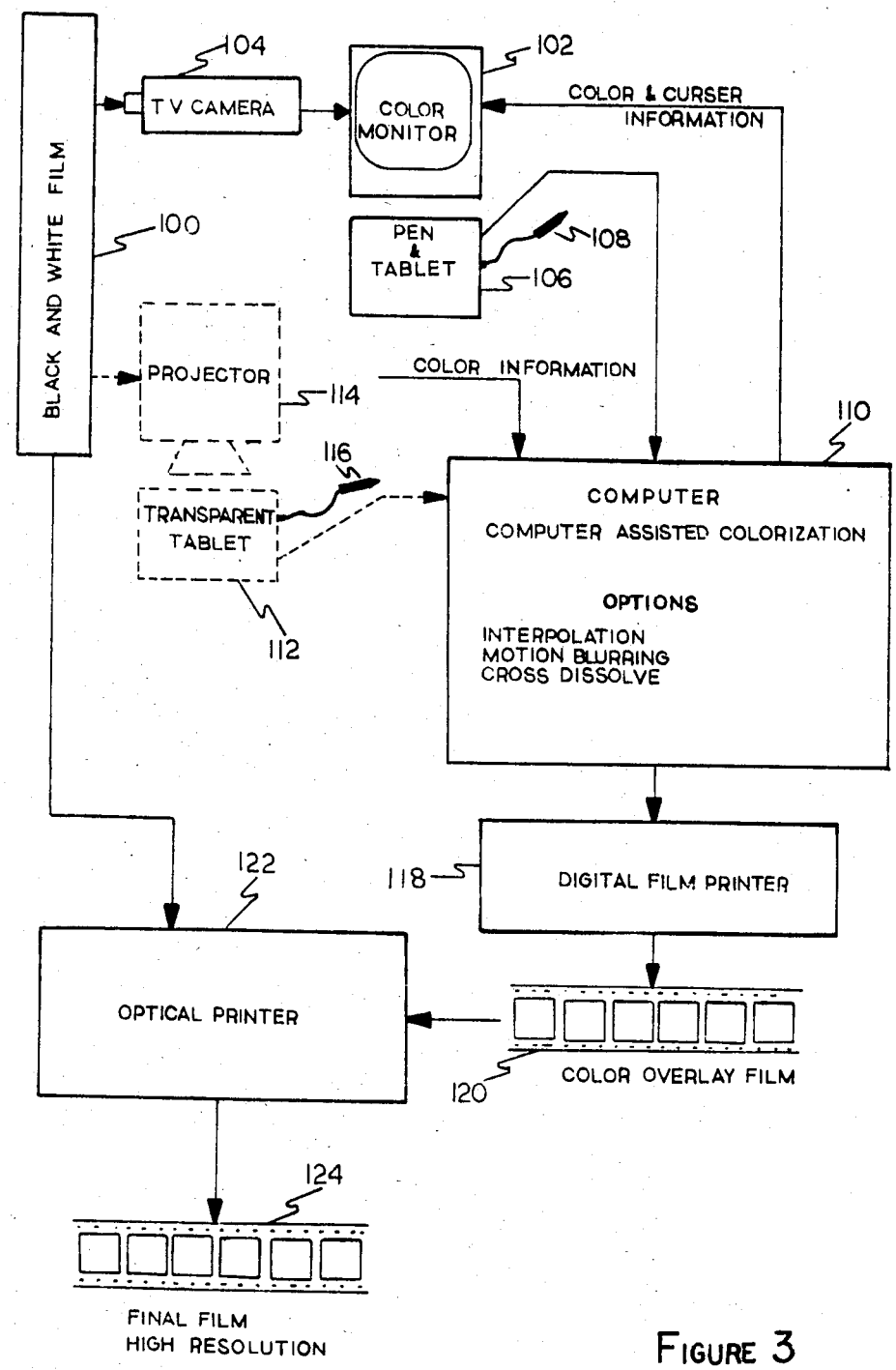
FIGS. 3 and 4 illustrate alternative systems for carrying out the invention.
Figure 4:
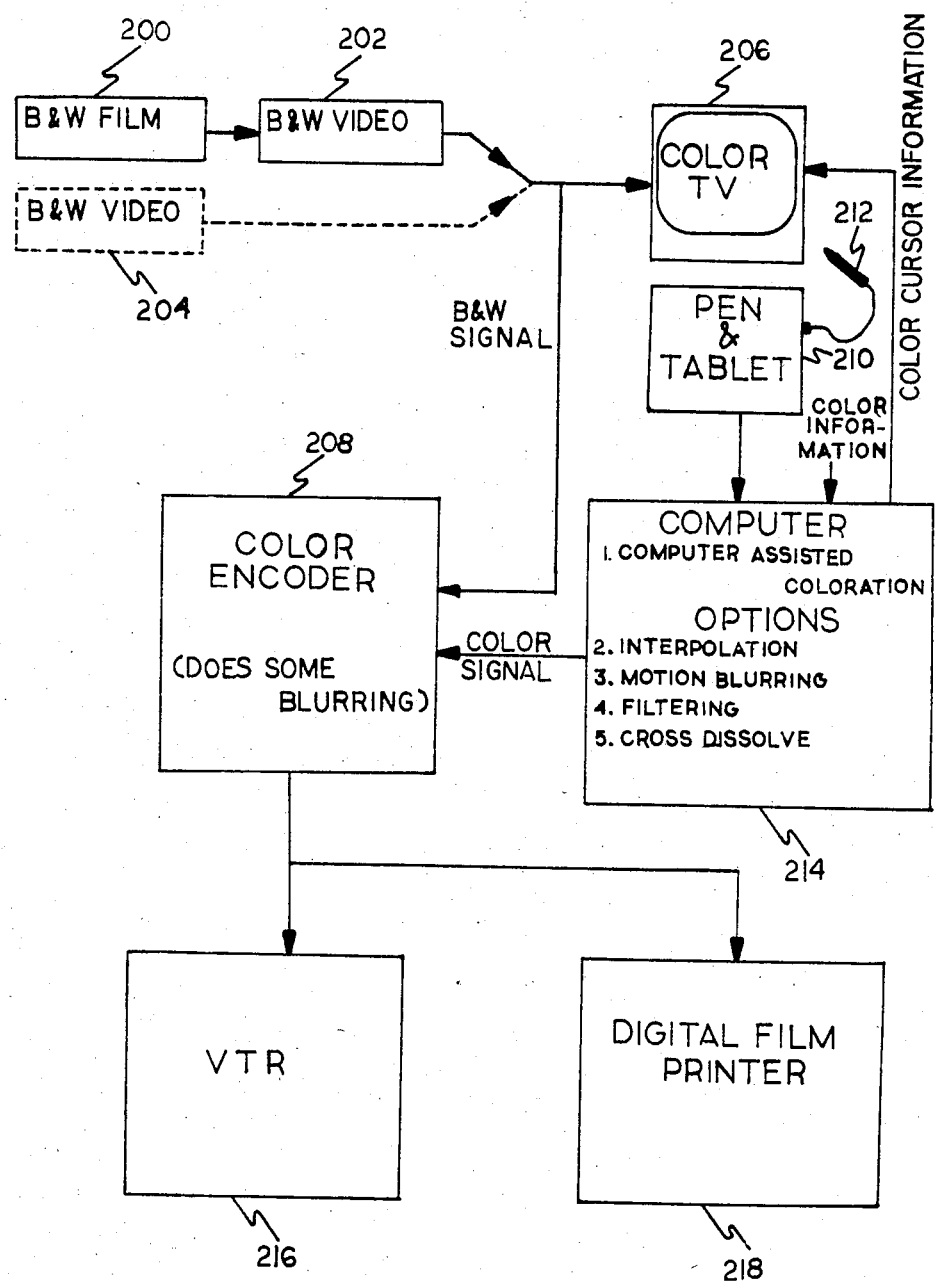

Different ways of implementing the above process are illustrated by the three systems shown in FIGS. 3 and 4.

Considering first FIG. 3, a black and white film original 100 is displayed on a television monitor 102 via a film projector and television camera 104. An X-Y data entry tablet 106 incorporating an electronic stylus 108 is used by a human operator to trace the color outlines of an image to be colorized. This image information is processed into color information through a computer 110. The computer, in turn, feeds back color information to the operator which is displayed on monitor 102. Alternatively black and white film original 100 may be projected onto a transparent X-Y data entry tablet 112 by a projector 114 to be traced with a stylus 116. Such a system is illustrated in dashed lines in FIG. 3.

As discussed above, area outlining, color choice and motion specification information is fed to computer 110. The computer coordinates the system components to accomplish the desired computer assisted colorization. In addition, computer 110 will perform the steps of interpolation between hand traced frames, edge traced blurring of objects based upon motion information, blurring of the color image (by filtering or other suitable method), and cross-dissolving between color components which generate color images for intervening frames.

The computer then generates a "color-only" information signal which is sent to a digital film printer 118 which generates a color overlay film 120. Color overlay film 120 is combined with original black and white film 100 by an optical printer 122 to generate high resolution colorized film 124.

An alternative system is illustrated in FIG. 4. In accordance with this system, black and white film 200 is converted by a video camera 202 into a video signal. Alternatively, film 200 and camera 202 may be replaced by a black and white video source such as a video tape recorder 204. This black and white video signal is displayed in a monitor 206 and sent to a color encoder 208 to be combined with a color signal to be generated as described below.

An X-Y position transducer 210 incorporating an electronic stylus 212 is used to generate color outline information which together with color choice information and motion specification is input into computer 214. Computer 214 generates a color signal which is combined with a black and white signal by color encoder 208 to generate a composite color image which, in turn, is sent to a video tape recorder 216. Alternatively, the output of the color encoder may be sent to a digital film printer 218 for generatation of a hard copy of the colorized motion picture. It is also noted that the output of the computer 214 is used to generate color information on monitor 206, allowing the operator to adjust the manually entered colors in any desired manner.

It should be noted that in the digital domain information requirements to store and process information are reduced in three ways. By using lower resolution for the color information, the number of pixels or dots in reduced (spatial resolution). Further, by generating the color information only, the number of bits required to specify each dot is reduced. This number of bits can be further reduced by limiting the number of hues of color that may be entered into the system. Thirdly, by generating color for only every Nth frame, information requirements are further reduced.

While an illustrative embodiment has been described, it is of course, understood that various modifications will be obvious to those with ordinary skill in the art. For example, the colorization process can be applied to a black and white image stored in the video domain as well as to a black and white film. Such modifications are within the spirit and scope of the invention, which is limited and defined only by the appended claims.

I claim:

1. A method of colorizing a series of black and white frames having relatively high resolution and containing only black and white information in a motion picture motion sequence, comprising the steps of:
   (a) generating color information for a single frame in a sequence,
   (b) blurring all portions of all said color information, and
   (c) combining said blurred color information with said relatively high resolution black and white information to generate a colored frame corresponding to said black and white frame and having high density luminence information and low deposing color information.

2. A method as in claim 1, further comprising the step of:
   (d) adding said same blurred color information to a first number of frames in said motion sequence and adjacent to said colorized frame to colorize said adjacent frames.

3. A method as in claim 2, further comprising the steps of:
   (e) colorizing a second frame which is a second number of frames subsequent to said single frame; and
   (f) interpolating color information between said single frame and said second frame to develop a number of intermediate sets of frame color information.

4. A method as in claim 3, wherein intermediate sets of frame color information corresponds only to a limited number of frames in said sequence and wherein said adding of color is performed on all remaining frames which are not associated with generated or interpolated color information by colorizing the remaining frames with the color information associated with the closest manually colorized or interpolatedly colorized frame to generate individually colorized frames for all frames in the sequence.

5. A method as in claim 4, wherein said color information is cross-dissolved information from an earlier and later adjacent colorized frame to colorize said remaining frames.

6. A method as in claim 5, wherein said color information and said black and white information are optically combined.

7. A method as in claim 5, wherein said color information and said black and white information are electronically combined.

8. A method as in claim 3, wherein said intermediate sets of frame color information are individually corrected by an operator.

9. A method as in claim 1, wherein blurring is varied in response to motion of a colored image contained on said black and white frame.

10. A method as in claim 9, wherein blurring is increased on the side of a moving image component closest to the next position of the image.

11. A method as in claim 1, further comprising the steps of:
(g) colorizing a second frame which is a second number of frames subsequent to said single frame; and
(h) interpolating color information between said single frame and said second frame to develop a number of intermediate sets of frame color information.

12. A method of colorizing a series of black and white frames containing black and white information having a first resolution in a motion picture sequence, comprising the steps of:
(a) generating color information for a single frame in the sequence;
(b) processing said color information to generate processed color information having a second resolution, said second resolution being lower than said first resolution; and
(c) combining said lower resolution color information to the high resolution black and white frame to colorize said black and white frame.

13. A method as in claim 12, wherein said second resolution is lower only in spatial resolution.

14. A method as in claim 12, wherein said second resolution is lower in the accuracy with which a particular color is defined.

* * * * *